United States Patent
Rubin et al.

(10) Patent No.: US 7,568,193 B2
(45) Date of Patent: Jul. 28, 2009

(54) METHOD AND APPARATUS FOR STATIC SINGLE ASSIGNMENT FORM DEAD CODE ELIMINATION

(75) Inventors: Norman Rubin, Cambridge, MA (US); Myron King, Cambridge, MA (US)

(73) Assignee: ATI Technologies, Inc., Markham, ON (CA)

( * ) Notice: Subject to any disclaimer, the term of this patent is extended or adjusted under 35 U.S.C. 154(b) by 768 days.

(21) Appl. No.: 10/767,480

(22) Filed: Jan. 28, 2004

(65) Prior Publication Data

US 2005/0166194 A1    Jul. 28, 2005

(51) Int. Cl.
   *G06F 9/45*    (2006.01)
(52) U.S. Cl. ................ 717/159; 717/140; 717/151; 717/154
(58) Field of Classification Search .......... 717/159–161
   See application file for complete search history.

(56) References Cited

U.S. PATENT DOCUMENTS

| | | | | |
|---|---|---|---|---|
| 5,293,631 A * | 3/1994 | Rau et al. | ............... | 717/154 |
| 5,465,374 A | 11/1995 | Dinkjian et al. | | |
| 5,475,842 A * | 12/1995 | Gilbert et al. | ............... | 717/160 |
| 5,659,754 A * | 8/1997 | Grove et al. | ............... | 717/158 |
| 5,761,514 A * | 6/1998 | Aizikowitz et al. | ............... | 717/158 |
| 5,768,596 A * | 6/1998 | Chow et al. | ............... | 717/154 |
| 5,842,017 A * | 11/1998 | Hookway et al. | ............... | 717/158 |
| 6,035,124 A | 3/2000 | Ng | | |
| 6,049,667 A | 4/2000 | Bates | | |
| 6,077,314 A | 6/2000 | Ng | | |
| 6,128,775 A * | 10/2000 | Chow et al. | ............... | 717/156 |
| 6,571,387 B1 | 5/2003 | Chow et al. | | |
| 6,594,665 B1 | 7/2003 | Sowa et al. | | |
| 6,751,792 B1 * | 6/2004 | Nair | ............... | 717/161 |
| 7,353,503 B2 * | 4/2008 | Nair et al. | ............... | 717/151 |
| 2004/0128660 A1 * | 7/2004 | Nair et al. | ............... | 717/156 |
| 2005/0198468 A1 | 9/2005 | Rubin et al. | | |
| 2006/0070050 A1 * | 3/2006 | Chen | ............... | 717/151 |

OTHER PUBLICATIONS

R. Cytron et al., Efficiently Computing Static Single Assignment Form and the Control Dependence Graph, ACM Trans on Programming Languages and Systems, Mar. 7, 1991, pp. 1-46.

(Continued)

*Primary Examiner*—Tuan Q Dam
*Assistant Examiner*—Ben C Wang
(74) *Attorney, Agent, or Firm*—Vedder Price, P.C.

(57) ABSTRACT

A method and apparatus for SSA dead code elimination includes examining a first instruction off a worklist, wherein the first instruction includes previous link and a write mask and the first instruction is an SSA instruction. The method and apparatus further includes examining at least one second instruction of the machine code, wherein the at least one second instructions are sources of the first instruction and the at least one second instructions are SSA instruction. In the method and apparatus, each of the at least one second instructions include a previous link and a write mask. The method and apparatus further includes determining if any components within a particular field of the at least one second instruction are live. If none of the components are live, the method and apparatus provides for deleting the second instruction from the machine code as it is determined that this instruction is extraneous, dead code.

22 Claims, 4 Drawing Sheets

OTHER PUBLICATIONS

Rosen, Barry K. et al.; Global Value Numbers and Redundant Computations; 1988; pp. 12-27: supplied by the British Library, www.bl.uk.

Simpson, Loren Taylor, "Value-Driven Redundancy Elimination", a Thesis submitted in partial fulfillment of the requirements of the degree Doctor of Philosophy, Apr. 1996, Houston, Texas.

* cited by examiner

METHOD AND APPARATUS FOR STATIC SINGLE ASSIGNMENT FORM DEAD CODE ELIMINATION

FIELD OF THE INVENTION

The present invention relates generally to computer program compilers and more specifically to optimization of machine language code through the utilization of dead code elimination of instructions in static single assignment form.

BACKGROUND OF THE INVENTION

In a computer system, a compiler is utilized to convert a software program in a programming language into machine language. A processor then may execute the machine language to perform the operations designated by the software program. Although, inefficiencies arise when using compilers due to the presence of executable instructions within the machine language whose results do not affect program outputs.

One solution to overcome inefficiencies is the elimination of dead code, wherein dead code is executable program instructions whose results do not affect program output. A common scheme for removing dead code is based on program representations called static single assignment form (SSA). The SSA form can be briefly described as a form where each definition of a variable is given a unique version, and different versions of the same variable can be regarded as different program variables. Each use of a variable version can only refer to a single universal definition. When several definitions of a variable reach a common node, typically referred to as a merging node, in the control flow graph of the program, a phi function assignment statement, $a_n = \Phi(a_1, a_2, \ldots a_m)$, is inserted to merge the variables into the definition of a new variable version $a_n$. Thus, the semantics of single reaching definitions are maintained.

The SSA based dead code elimination may be performed by adding a single bit to each instruction, wherein that bit is designated as a live bit and initially all live bits are set to false. The next step is to identify a set of critical instructions, wherein critical instructions are instructions that directly produce a program output. As long as a worklist of instructions is not empty, select an instruction from the worklist. Thereupon, walking backwards over SSA links, from use to definition, the next step is to identify all instructions that are needed as a source of the originally selected instruction. If the instruction needed for the originally selected instruction is not live, the instruction then is marked as live and added to the worklist.

The process is repeated for all instructions on the worklist. Once the worklist is empty, the value of the live bit determines if the instruction is live or dead. This provides an efficient scheme, since adding an instruction to the worklist can occur at most only one time and also designates all dead code. Although, this current approach is limited because it can only provide for the deletion of scalar instructions and fails to detect dead components. This approach is described in further detail in R. Cytron et al., *Efficiently computing static single assignment form an the control depend graph*, ACM Trans. On Programming Languages and Systems, 13(4), pp. 451-490, October 1991.

Another approach for the elimination of dead code is based on extending the single live bit to a set of bits based on the computation being performed with a specific number of bits as disclosed in U.S. Pat. No. 6,571,387 entitled "Method and computer program product for global minimization of sign-extension and zero-extension operations. The number of bits may not be supported by a host processor, such as a host processor might require computations to be done in sixty-four (64) bit integers, while the program instructions have been specific to thirty-two (32) bits integers. In this approach, a compiler may insert instructions to compensate for this difference. If a compiler can determine that all of the upper bits are dead code, the extra inserted instructions may be deleted.

This technique extends SSA based dead code elimination by adding a bit field to each instruction of the maximum size of a generated value. Using this bit mask, the nth bit that is used in the instruction will be set to a value of 1. During the backward walk over the SSA links, the process updates the bits in each source instruction. Therefore, once all of the SSA links have been examined, each instruction has been marked with the exact bits used. If an instruction is a sign or zero extension instruction, and the upper bits are not marked, then the instruction may be dead and thereby eliminated. This technique is limited to dead code operations that consist of sign or zero extension instructions.

In a single instruction multiple data (SIMD) processing environment, there are advantages to using a superword register, wherein a superword register includes a hardware resource that can hold a small, but more than one, number of words of data. In one exemplary orientation, the superword register can hold up to 128 bits divided into four floating point components.

Instructions that operate on superword registers operate in parallel on all components and therefore are capable of achieving very high performance provided that more than one component contains data. If a program computes an unused value in a superword component, then the value of the component is said to be dead, whereas the other components are termed live. Some compilers using superword registers fail to eliminate the dead code and therefore reduce operating efficiency due to extra un-needed components. For example, the disclosure of U.S. Pat. No. 6,571,387 does not provide for dead code elimination using a superword register. Superword registers provide improved processing times in a SIMD environment and there does not exist a dead code elimination technique with a superword register. Therefore, there exists a need for removing dead code from a superword register.

DETAILED DESCRIPTION OF A PREFERRED EMBODIMENT

Briefly, a method and apparatus for dead code elimination includes adding to each instruction (1) a set of bits called a write mask (one per component) used to indicate the components produced by the instruction, (2) a link called the "previous write" linking the instruction with the prior instruction writing components of the same superword, and (3) a set of bits (one per component) called live bits, indicating the components consumed by subsequent uses of the superword register and the instruction is in SSA form. Initially all live bits are set to false.

Instructions are processed from a work list. The instruction may be any suitable executable instruction, such as but not limited to a mathematical instruction, for example addition, subtraction, multiplication, division, an equivalence instruction, for example a equals b, or any other suitable instruction found within a programming language for conversion by a compiler into a machine level language. Furthermore, a worklist is any suitable collection of instructions. The next step is to identify a set of critical instructions, wherein critical instructions are instructions that directly produce a program output. All critical instructions are placed on the work list.

As each instruction I is removed from the worklist, a backward walk over the ssa links and partial write links, can be used to identify each instruction J which produces a source used by I. Based on the live bits in I, the corresponding live bits of J may be increased. If I uses a component produced by J and the live bits of J for that component are not set, then set the live bit for that component in instruction to on, and add J to the worklist.

The preceding computation is repeated until the worklist is empty.

In the method and apparatus, each of the instructions include a previous link, a list of live components and a write mask, where a previous link connects instructions that write different components of the same resource and the write mask is an n-bit field where n is determined by the number of components of a superword register. For example, if a superword register allows for four components, this provides for a write mask having four bits, such as an instruction associated with an x, y, z and w field.

The method and apparatus further includes determining if all components within a particular resource of the at least one second instruction are required. As discussed above, in one embodiment having 4 components, a determination is made if the x field is required, if the y field is required, if the z field is required and if the w field is required. If none of the components are required, the method and apparatus provides for deleting the first instruction as it is determined that this instruction is extraneous, otherwise referred to as dead code. Therefore, the method and apparatus provides for elimination of dead code by examining the steps of the instructions in accordance with the parameters of the SSA based instructions.

Figure 1:
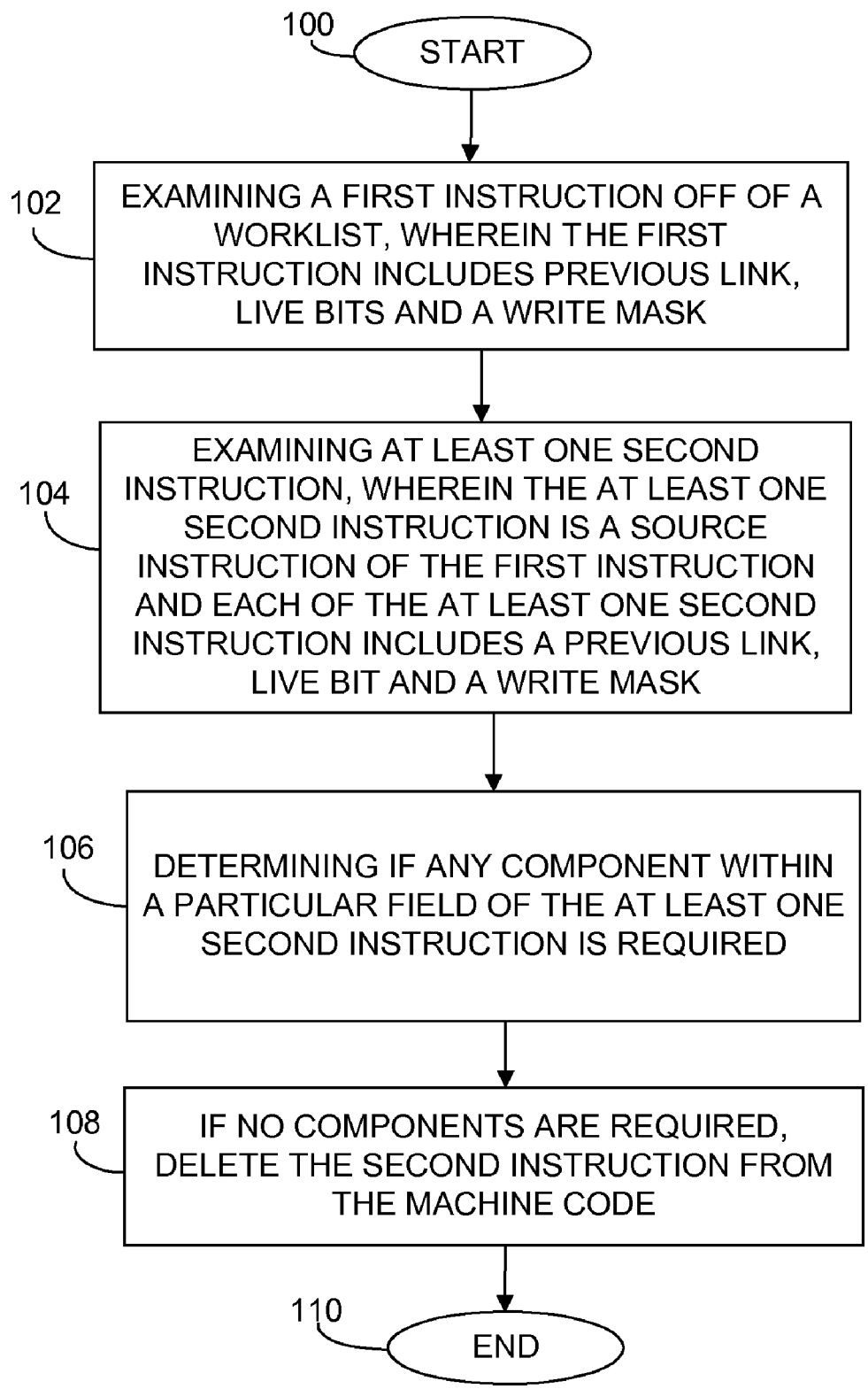
FIG. 1 illustrates a flowchart of a method for dead code elimination in accordance with one embodiment of the present invention.

FIG. 1 illustrates the steps of one embodiment of a method for eliminating dead code. The method begins, step 100, by examining a first instruction off of a worklist, wherein the first instruction includes a previous link, live bits and a write mask, step 102. A standard instruction includes a first term and a second term, wherein the instructions disposed on the worklist have the three additional fields added thereto. The previous link is a field that indicates a previous instruction and the write mask allows for operation and coordination of instructions with a superword register. The write mask indicates components produced by this instruction or by a prior instruction via the previous link. As the superword register has a plurality of components, the write mask coordinates instructions with specific components. This allows for operation of compiler operations such as a swizzle and maintenance of component-specific based calculations.

The first instruction is examined to determine its source instructions. Step 104 is examining at least one second instruction, wherein each is a source instruction of the first instruction and each includes a previous link, a set of live bits and a write mask, The previous link, live bits and the write mask of the at least one second instruction has the same structure of the previous link, live bits and the write mask as the first instruction pulled off of the worklist.

Step 106 is determining if any components within a field of the at least one second instruction are required. This step is performed by looking at each component. In the embodiment having four component, the x component is examined, the y component is examined, the z component is examined and the w component is examined to determine if each component is live (i.e., required). Also noting in the method and apparatus that with the operation of a swizzle function, the various components may be representative of other specified components.

Step 108 is deleting the second instruction from the machine code if no components are live. If no components are live, this means that this particular instruction is extraneous because result of this instruction is not used by another instruction. Thereupon, the method is complete, step 110.

Figure 2:
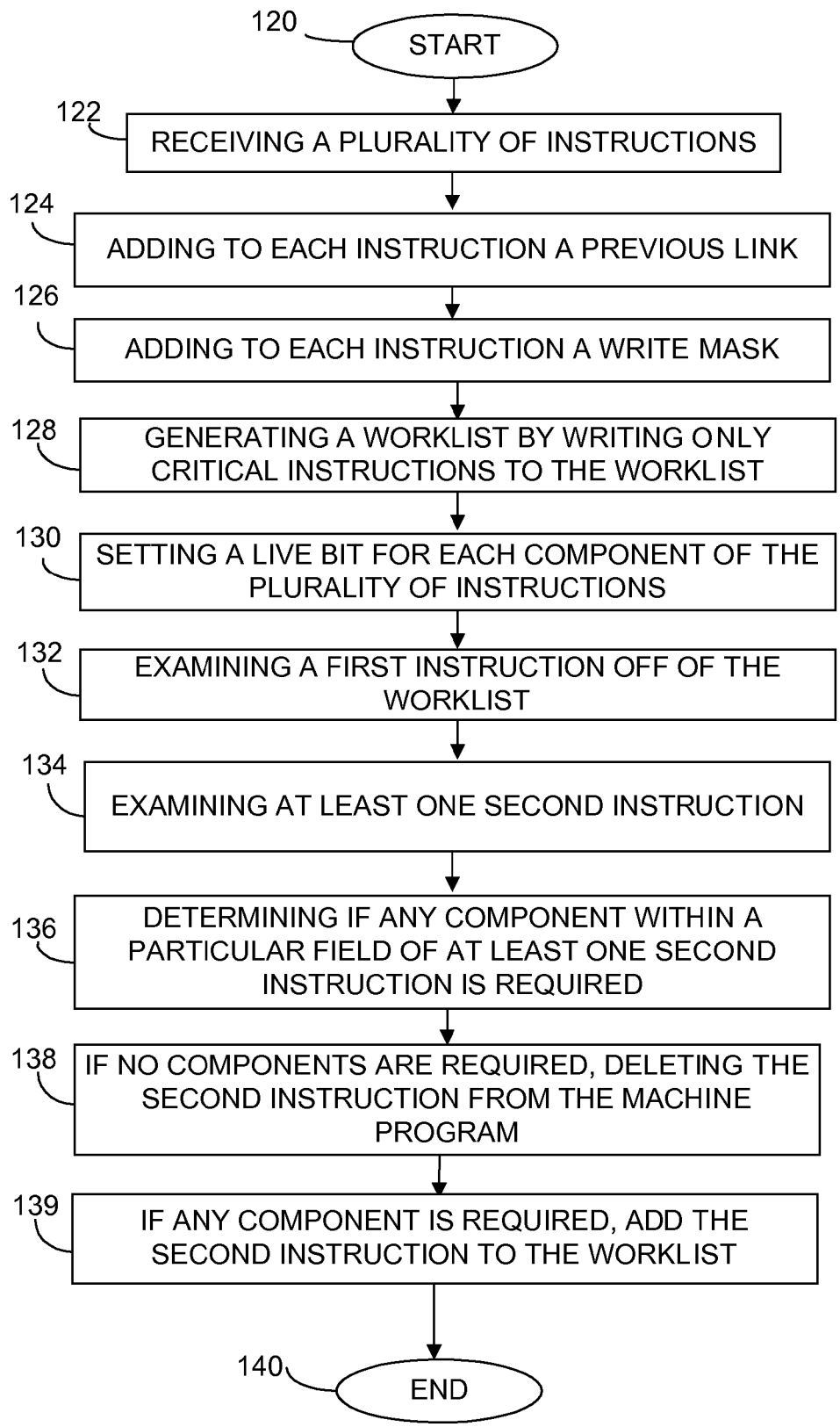
FIG. 2 illustrates a flowchart of a method for dead code elimination in accordance with another embodiment of the present invention.

FIG. 2 illustrates a further embodiment of a method for eliminating dead code. Similar to FIG. 1, this method is performed by a compiler operating to convert a program language software code into a machine language code, otherwise referred to as compiling the program language software. The method begins 120, by receiving a plurality of instructions, step 122. These instructions are in SSA form.

Step 124 is adding to each instruction a previous link. The previous link indicates a previous instruction that produces for various components within a multiple component resource. Step 126 is adding to each instruction a write mask. As discussed above, the write mask is an n-bit field and n is the number of components in a superword register. Step 128 is generating a worklist by writing only critical instructions to the worklist. This step is accomplished by examining each instruction and determining if the instruction directly produces a program output, then it is deemed critical.

Step 130 is setting a live bit for each component of the plurality of instructions. In one embodiment, this live bit is an n-bit field, where n is the number of components in the superword register and the live bit is true if it is known that the specific component, for example x, y, z or w, is not dead. Thereupon, step 132 of the method is examining a first instruction off of the worklist. In one embodiment, the step of examining the instruction includes walking backwards over the SSA links, steps defining particular instructions relative to a product, as discussed in greater detail in FIG. 5. The examination includes identifying all instructions that are needed as the source of the first instruction. Based on the operation of the instruction, any input swizzles and the write mask of the instruction, the examination includes identifying the bits that are required from a particular instruction.

Step 134 is examining further instructions, the at least one second instruction. This method is an iterative process looking at multiple instructions to determine which instructions are extraneous, dead code. Therefore, step 136 is determining if any component within a particular field of the at least one second instruction is required for the first instruction. If no components are required, step 138 is deleting the second instruction from the machine program, as this instruction is dead code. If any component is required, the second instruction is added to the worklist, step 139. Thereupon, the method is complete, step 140.

It should also be noted that in the present invention, the maximum number of times any single instruction may be added to the worklist is the number of components within the superword register based on the rate of convergence. For example, if the superword register has four components, x, y, z and w, the instruction may be added only once for each component, and not necessarily the corresponding component but rather the component allocation due to swizzling. In other words, if a swizzle operation allocated the x component to the y component, the instruction may be added to the worklist based on the y component that is actually the x component, wherein the instruction may have been previously added to the list based on the x component.

Figure 3:
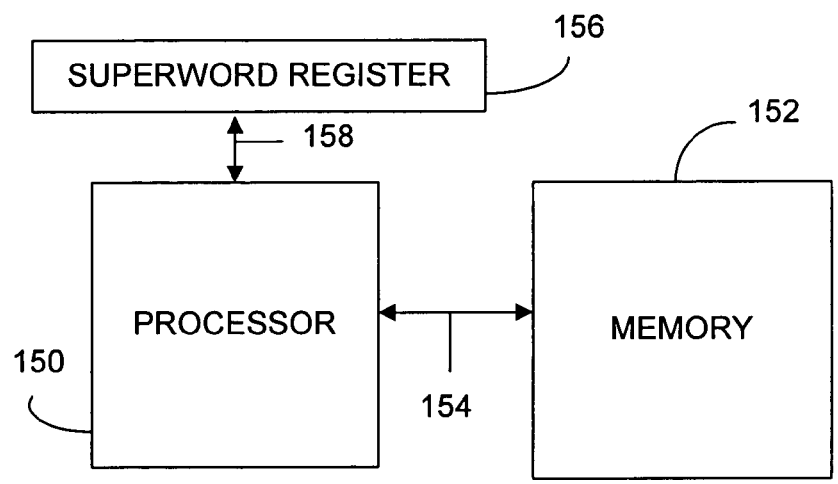
FIG. 3 illustrates a schematic block diagram of an apparatus for dead code elimination in accordance with one embodiment of the present invention.

FIG. 3 illustrates an apparatus for the elimination of dead code. A processor 150 is operatively coupled to a memory 152. The memory stores executable instructions 154 therein. The processor 150 may be, but not limited to, a single processor, a plurality of processors, a DSP, a microprocessor, an ASIC, a state machine, or any implementation capable of processing and executing software. The term processor should not be construed to refer exclusively to hardware capable of executing software, and may implicitly include DSP hardware, ROM for storing software, RAM, and any other volatile or non-volatile storage medium. The memory with executable instructions 152 may be, but not limited to, a single memory, a plurality of memory locations, shared memory, CD, DVD, ROM, RAM, EEPROM, optical storage, microcode or any other non-volatile storage capable of storing digital data for use by the processor 150.

The executable instructions 154 are provided to the processor 150 such that the processor 150 performs operations in response thereto. In one embodiment, the processor 150 performs compiler operations to convert programming language instructions into machine language instructions. The processor 150 is further operative to perform the steps of the methods illustrated in FIGS. 1 and 2 and processes discussed above as associated with the methods for dead code elimination. Therefore, the methods discussed above may be fully implemented and executed by the processor 150 in response to the executable instructions 154.

In one embodiment of the present invention, the processor 150 is further coupled to one or more superword registers 156, wherein each superword register may be a single hardware resource capable of holding a limited number of words of data. The processor 150, through performing the method steps discussed above with regards to FIGS. 1 and 2, reads and writes register values 158 to the superword register for tracking the status of the various superword components.

Thereupon, once the processor 150 compiles program code software into machine language, the compiled instructions are then designated on a component level, for example x, y, z, and w. In the SIMD environment, the instructions may then be efficiently provided to their corresponding processors, such as an x component processor, a y component processor, a z component processor and a w component processor, using the superword register.

Figure 4:
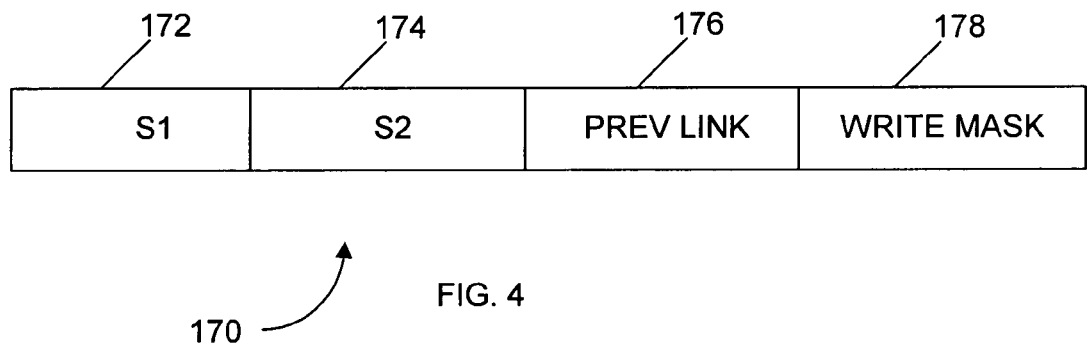
FIG. 4 illustrates a block diagram an instruction for use with a superword register in accordance with one embodiment of the present invention.

FIG. 4 illustrates a graphical representation of an instruction 170, in accordance with one embodiment of the present invention. The instruction includes the two components of the instruction, S1 172 and S2 174. Although, in the present invention the previous link field 176 is added, as well as the write mask 178. The added write mask 178 allows for usage of the instruction with the superword register based on tracking the superword register components. It should also be noted that in another embodiment, the instruction further includes a live bit, as discussed above.

Figure 5:
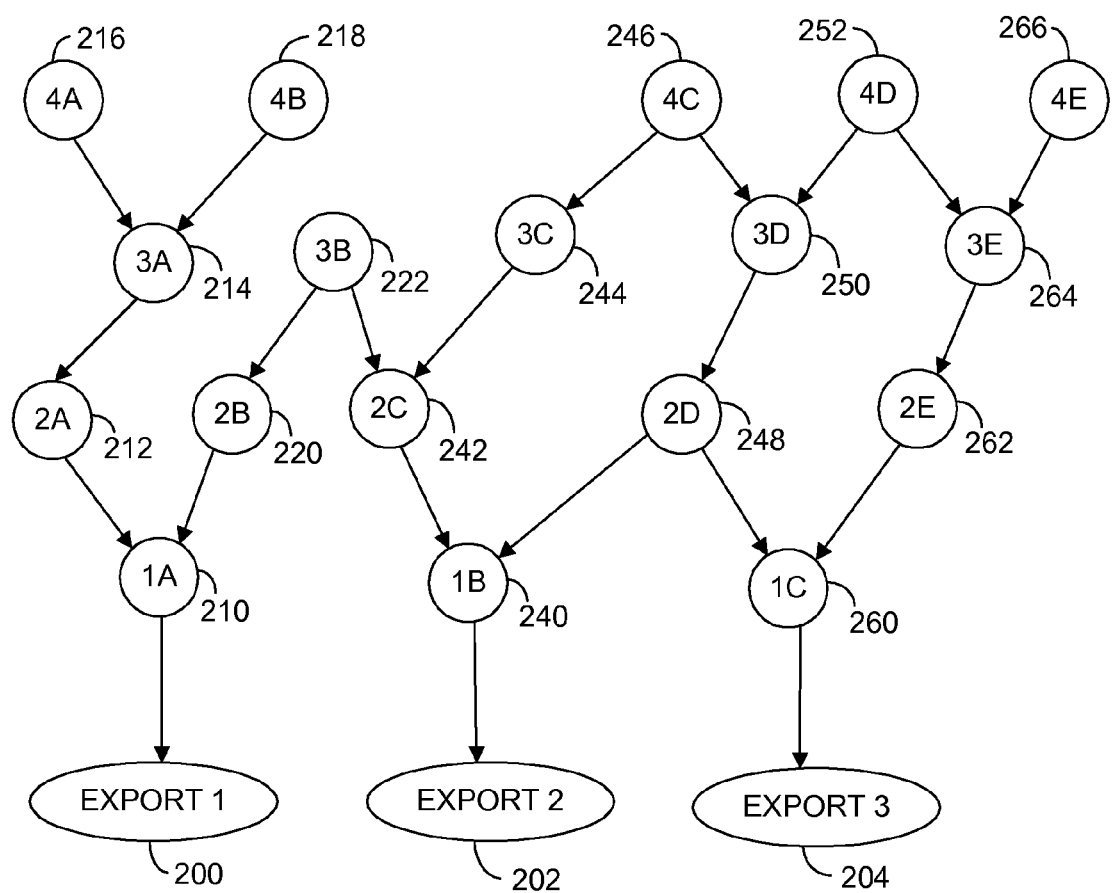
FIG. 5 illustrates a graphical representation of a plurality of decision trees of instructions and the elimination of dead code in accordance with one embodiment of the present invention.

FIG. 5 illustrates a graphical representation of a plurality of instructions that a typical compiler would optimize using the method and apparatus for eliminating dead code of the present invention. The illustrated example include 3 exports, 200, 202 and 204, wherein the exports are some output value, such as a computed value computed by the natural progression of the steps from top to bottom.

For example, walking backwards across SSA links, export 1 200 is the result of instruction 1A 210. 1A 210 is the result of the combination of 2A 212 and 2B 220. Following the SSA links, 2A is the result of an operation with just 3A 214, which is the result of 4A 216 and 4B 218. Back down SSA links, 2B 220 is the result of 3B 222, and this fully covers this illustrative example of the steps subsequent to the production of export 1 200.

In the elimination of dead code and the instructions illustrated in FIG. 5 having SSA form, the worklist is utilized to identify steps that are dead code. Therefore, in examining export 2 202, this is the result of 1B 240. 1B 240 is the result of an operation with 2C 242 and 2D 248. Walking up the SSA links, instruction 2C 242 is the result of 3B 222 and 3C 244. As 3B does not have any higher instructions, step 3C is examined as the result of 4C 246. Back down the SSA links, the second instruction for 1B 240 was 2D 248, which is the result of 3D 250, wherein 3D is the result of 4C 246 and 4D 252.

Following the progression of the third export 204, 1C 260 is based on 2D 248 and 2E 262. The instructions for 2D 248 were previously determined with respect to the second export 202, therefore, the instructions above 2D may be removed as dead code using the previous link, the write mask and in one embodiment the live bit for the SSA form instructions. With respect to 2E 262, this is the result of 3E 264 which is the result of 4D 252 and 4E 266. In the event there are any further instructions above 4D 252, these would have been determined upon inspection of the second export 202, therefore these instructions could also be eliminated as dead code.

As such, the present invention provides for the elimination of dead code in an SSA form instruction. Through the inclusion of the previous link value and the write mask, the instructions may be processed with a superword register for operation a SIMD environment. Therefore, through the modified instructions, the superword register may be utilized and data may be more readily provided to SIMD processor executing machine language operating instructions.

It should be understood that the implementation of other variations and modifications of the invention in its various aspects will be apparent to those of ordinary skill in the art and that the invention is not limited by the specific embodiments described herein. For example, the superword register may contain any suitable number of components and thereby the write mask contains the corresponding number of bits to allow for the effect management of any number of components in compiler operations, such as swizzles. It is therefore contemplated to cover by the present invention, any and all modifications, variations, or equivalents that fall within the spirit and scope of the basic underlying principles disclosed and claimed herein.

What is claimed is:

1. A method for static single assignment form dead code elimination, the method comprising:
examining a first instruction of a machine code off of a worklist in memory, wherein the first instruction includes a previous link and a write mask, wherein said write mask includes a bit corresponding to a component produced by said first instruction;
examining at least one second instruction, wherein the at least one second instruction is a source of the first instruction and wherein each of the at least one second instruction includes a previous link and a second write mask, wherein said second write mask includes a bit corresponding to a component produced by said second instruction;
determining, using said previous link of said at least one second instruction, if any components within a particular field of the at least one second instruction are required, wherein said previous link of said second instruction links said second instruction with a prior instruction that writes at least one component of said components;
when no components of the at least one second instruction are required, deleting the at least one second instruction from the machine code; and
when any component of the at least one second instruction is required, adding the at least one second instruction to the worklist in the memory.

2. The method of claim 1 further comprising:
generating the worklist by:
for each of a plurality of instructions, determining if the instruction is a critical instruction; and
if the instruction is a critical instruction, writing the instruction to the worklist.

3. The method of claim 2 further comprising:
setting a live bit for each component of the plurality of instructions.

4. The method of claim 2 wherein each critical instruction is an instruction that generates an export value.

5. The method of claim 2 further comprising:
prior to generating the worklist:
receiving a plurality of instructions;
adding to each instruction the previous link; and
adding to each instruction the write mask.

6. The method of claim 5 wherein the write mask is a multi-bit field representing a number of components in a superword register.

7. The method of claim 6 wherein each of the plurality of instructions are written to the worklist a predetermined number of times, wherein the predetermined number of times is based on the number of components in the superword register.

8. A method for static single assignment form dead code elimination comprising:
receiving a plurality of instructions;
adding to each instruction a previous link, wherein said previous link links said each instruction with a prior instruction that writes at least one component;
adding to each instruction a write mask, wherein said write mask includes a bit corresponding to a component produced by said each instruction; and
generating a worklist in memory by:
for each of the plurality of instructions, determining if the instruction is a critical instruction; and
if the instruction is a critical instruction, writing the instructions to the worklist in the memory.

9. The method of claim 8 further comprising:
setting a live bit for each component of the plurality of instructions;
examining a first instruction off of the worklist;
examining at least one second instruction in the machine code, wherein the at least one second instruction is a source of the first instruction;
determining if any component within a particular field of the at least one second instruction is live; and
when no components of the at least one second instruction are live, deleting the second instruction from the worklist.

10. The method of claim 8 wherein each critical instruction is an instruction that generates an export value.

11. The method of claim 8 wherein the write mask is a multi-bit field representing a number of components in a superword register.

12. The method of claim 11 wherein each of the plurality of instructions are written to the worklist a predetermined number of times, wherein the predetermined number of times is based on the number of components in the superword register.

13. An apparatus for static single assignment form dead code elimination comprising:
at least one memory device storing a plurality of executable instructions of a machine code; and
at least one processor operably coupled to the at least one memory device, operative to receive the plurality of executable instructions such that the at least one processor, in response to the plurality of executable instructions is further operative to:
examine a first instruction off of a worklist, wherein the first instruction includes previous link and a write mask, wherein said write mask includes a bit corresponding to a component produced by said first instruction;
examine at least one second instruction of the machine code, wherein the at least one second instruction is a source of the first instruction and each of the at least one second instruction includes a previous link second and a write mask, wherein said second write mask includes a bit corresponding to a component produced by said second instruction;
determine, using said previous link of said at least one second instruction, if any component within a particular field of the at least one second instruction is live, wherein said previous link of said second instruction links said second instruction with a prior instruction that writes at least one component of said components; and
when no components are live, delete the second instruction from the machine code.

14. The apparatus of claim 13 wherein the at least one processor in response to the plurality of instructions executable instructions is further operative to:
generate the worklist by:
for each of a plurality of instructions, determining if the instruction is a critical instruction; and
if the instruction is a critical instruction, writing the instruction to the worklist.

15. The apparatus of claim 14 wherein each critical instruction is an instruction that generates an export value.

16. The apparatus of claim 14 further comprising:
a superword register operably coupled to the at least one processor, wherein the write mask is a multi-bit field representing a number of components in the superword register.

17. An apparatus for static single assignment form dead code eliminations comprising:
at least one memory device storing a plurality of executable instructions of a machine code; and
at least one processor operably coupled to the at least one memory device, operative to receive the plurality of executable instructions such that the at least one processor, in response to the executable instructions is further operative to:
receive a plurality of instructions;
add to each instruction a previous link, wherein said previous link links said each instruction with a prior instruction that writes at least one component;

add to each instruction a write mask, wherein said write mask includes a bit corresponding to a component produced by said each instruction; and
generate a worklist by:
for each of the plurality of instructions; determining if the instruction is a critical instruction; and
if the instruction is a critical instruction, writing the instructions to the worklist;
examine a first instruction off of the worklist;
examine at least one second instruction from the machine code, wherein the at least one second instruction is a source of the first instruction;
determine, using a previous link of said at least one second instruction, if any component within a particular field of the at least one second instruction is live; and
when no component is live, delete the second instruction from the machine code.

18. The apparatus of claim 17 further comprising:
a superword register operably coupled to the at least one processor, wherein the write mask is a multi-bit field representing a number of components in a superword register.

19. The apparatus of claim 14, wherein the at least one processor in response to the plurality of executable instructions is further operative to set a live bit for each component of the plurality of instructions.

20. The method of claim 9, further comprising:
when any component of the at least one second instruction is live, adding the at least one second instruction to the worklist.

21. The apparatus of claim 13, wherein the at least one processor in response to the plurality of instructions executable instructions is further operative to:
when any component of the at least one second instruction is live, add the at least one second instruction to the worklist.

22. The apparatus of claim 17, wherein the at least one processor in response to the plurality of instructions executable instructions is further operative to:
when any component of the at least one second instruction is live, add the at least one second instruction to the worklist.

* * * * *